United States Patent

[11] 3,584,443

| [72] | Inventor | Shelly A. Bulin |
| | | Bettendorf, Iowa |
| [21] | Appl. No. | 808,528 |
| [22] | Filed | Mar. 19, 1969 |
| [45] | Patented | June 15, 1971 |
| [73] | Assignee | J. I. Case Company |
| | | Continuation-in-part of application Ser. No. 556,373, June 9, 1966, now abandoned. |

[54] CORN HEADER FOR COMBINES
9 Claims, 4 Drawing Figs.

[52] U.S. Cl. ................................................ 56/13.8, 56/63, 56/105, 56/14.1
[51] Int. Cl. ................................................ A01d 45/02
[50] Field of Search ................................................ 56/15—18, 63—65, 56, 57, 104, 105, 109, 110, 238; 130/5 B—D

[56] References Cited
UNITED STATES PATENTS

| 351,916 | 11/1886 | Hilbert | 56/65 |
| 2,499,688 | 3/1950 | Smith | 56/65 |
| 2,515,808 | 7/1950 | Stoddard | 56/64 |
| 2,894,364 | 7/1959 | Ehler | 56/110 X |
| 2,934,879 | 5/1960 | Jones | 56/63 |
| 3,399,517 | 9/1968 | Magee | 56/63 X |
| 3,470,682 | 10/1969 | Evans | 56/105 |

*Primary Examiner*—Louis G. Mancene
*Assistant Examiner*—J. A. Oliff
*Attorney*—Dressler, Goldsmith, Clement and Gordon

ABSTRACT: A corn header for combines wherein the combine moving into a corn field acts first to cut the corn stalks and direct them onto a draper roll. The corn stalks are then moved in a generally longitudinal direction into engagement with snapping rolls, which pull the stalks therethrough, snap the corn off and deposit it onto transversely moving gathering chains which direct the corn into a centrally located conveyor which carries the corn into a storage area.

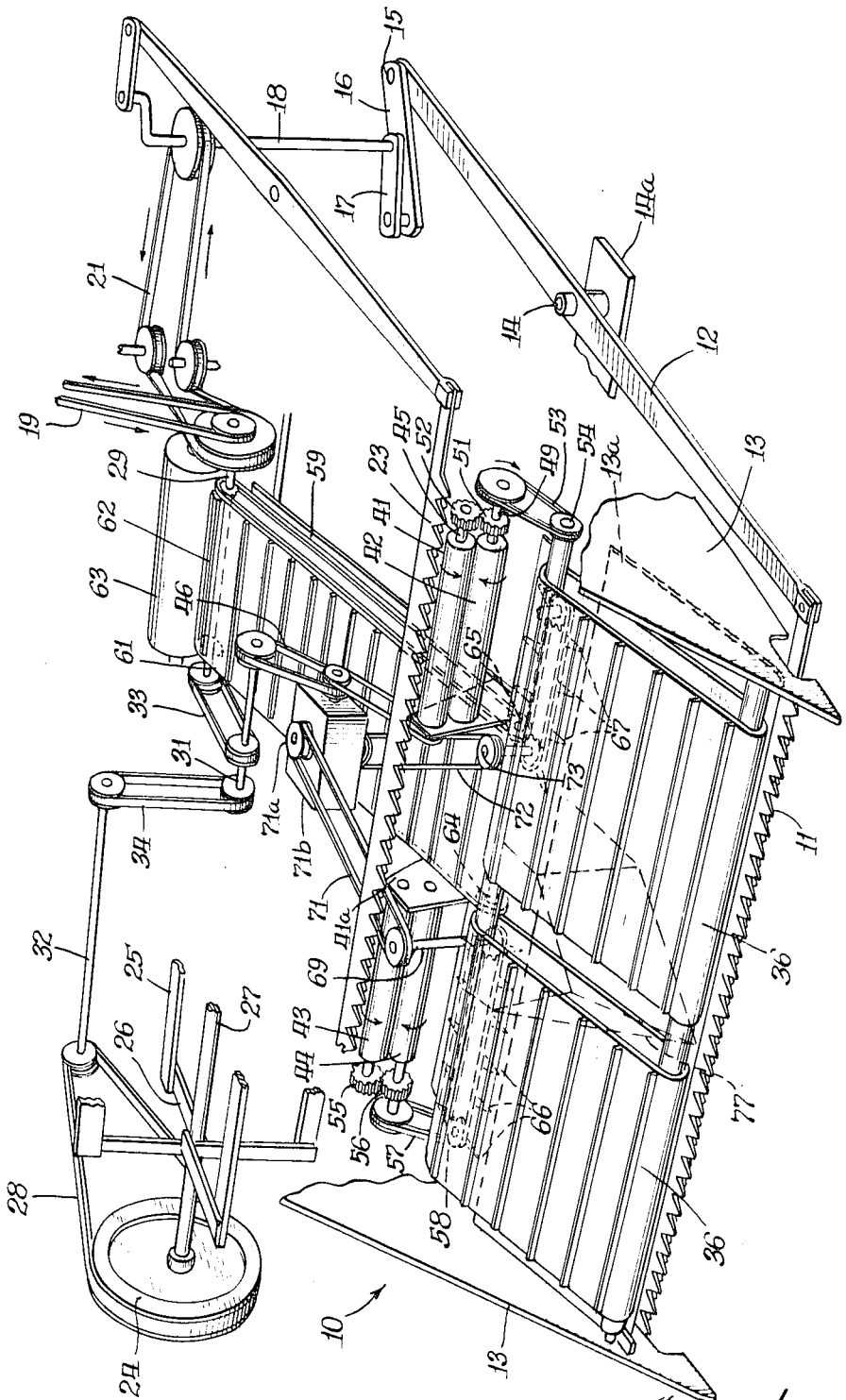

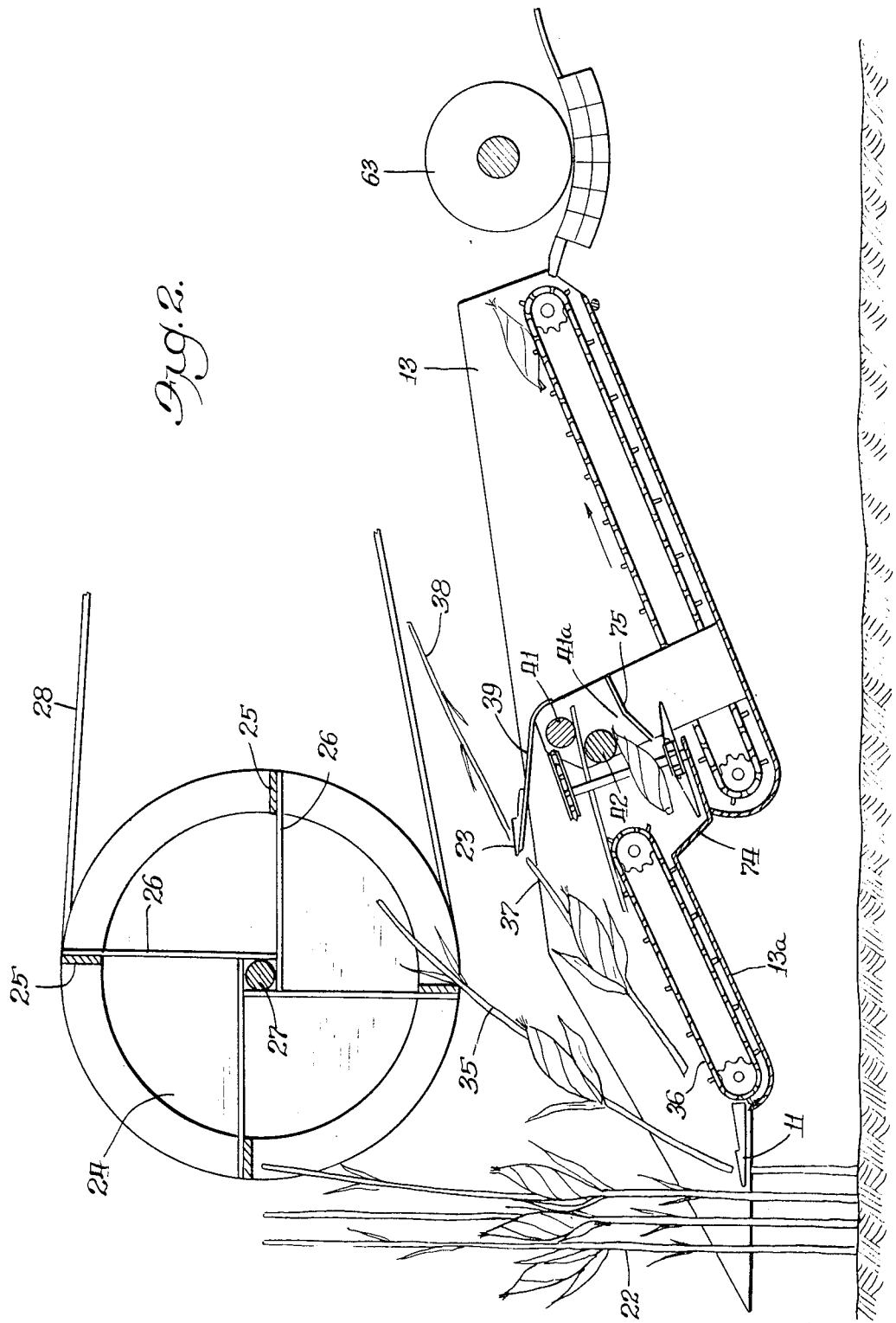

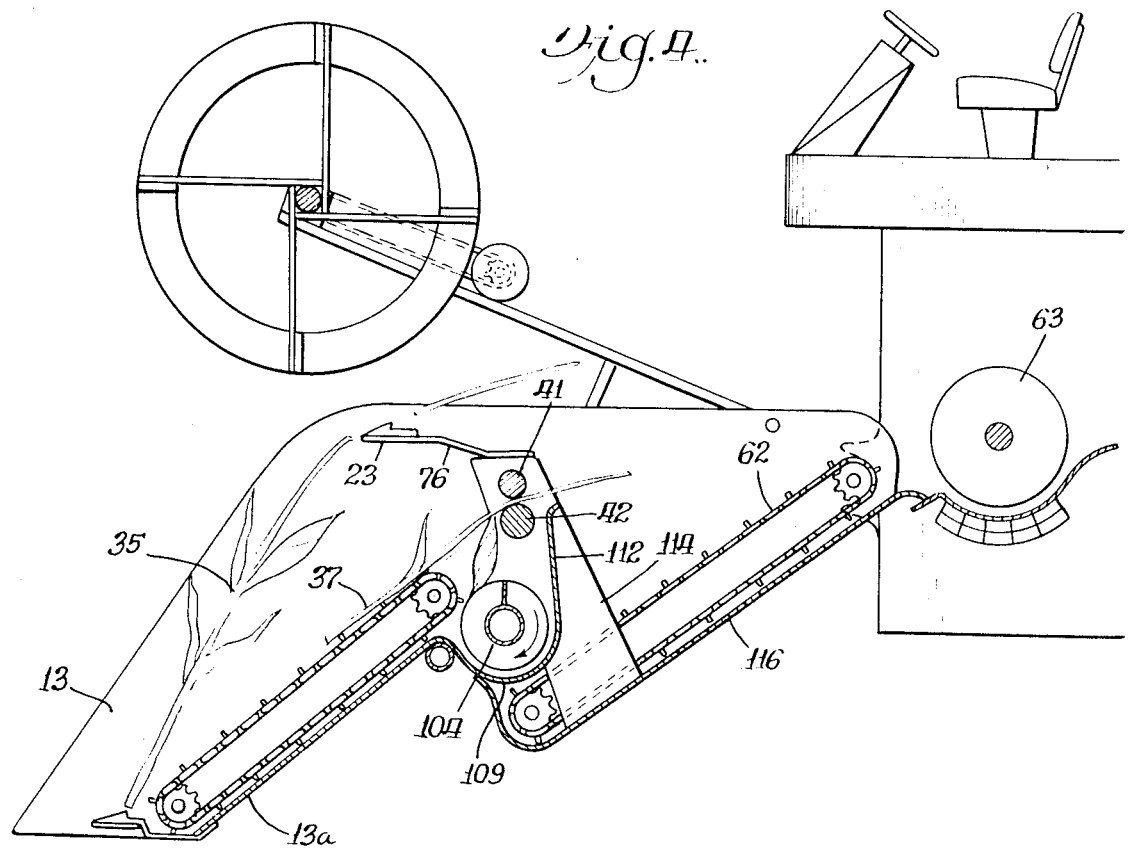
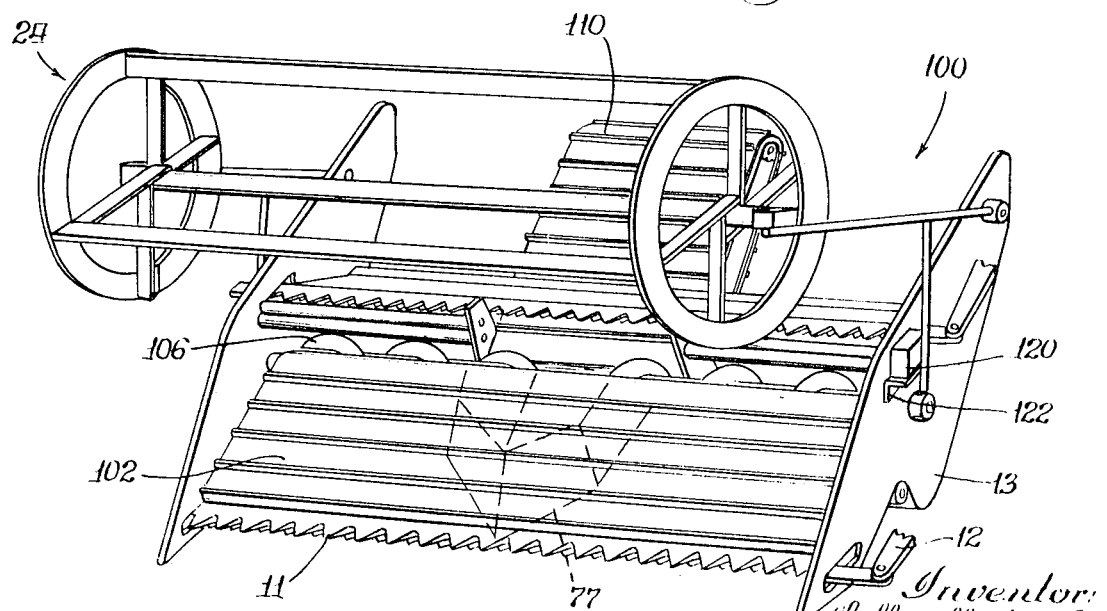

CORN HEADER FOR COMBINES

REFERENCE TO RELATED APPLICATIONS

This application is a continuation-in-part of my application Ser. No. 556,373 filed June 9, 1966 now abandoned.

BACKGROUND OF THE INVENTION

The present invention relates to a corn header for combines, and, more particular, to means for topping corn stalks prior to separation of the ears from the stalks when the corn is harvested.

In current practice, many cereal plants, such as corn, are harvested by a combine having a header mounted thereon for removing the ears from the stalks and delivering them to the combine for husking and shelling. The header is provided with means for cutting standing stalks of corn at any desired distance above the ground, and the upper cut portions of the stalks are mechanically processed by passing them through oppositely rotating snapping rolls to remove the ears. The stalks are ejected onto the ground from the header after the ears have been removed. The header also has means for conveying the ears to the combine. The useful work capacity of the header is limited by the total quantity of stalks and foliage that passes between the snapping rolls.

SUMMARY OF THE INVENTION

In accordance with the present invention, there is provided an improved method for increasing the efficiency of a harvesting mechanism. The method is accomplished by a mechanism which includes a header having a second cutting means spaced rearwardly of and at a higher level than the first cutting means. The second cutting means removes the top portion of the stalk and most of the foliage from the stalk before it is engaged by the separating means or snapping rolls. Thus, by substantially reducing the quantity of material that must pass between the snapping rolls, the upper cutting means increases the useful work capacity of the header and enhances its efficiency.

As the header is moved into engagement with a standing corn stalk, the lower cutting means cuts the stalk at a predetermined distance above the ground and a beater strikes the upper portion of the cut stalk to make it fall rearwardly. The upper cutting means engages the upper portion of the stalk as it falls, and cuts the upper portion of the stalk at a predetermined distance from the first cut to separate its nonbearing top portion and most of the foliage from the ear bearing midsection which then falls on a draper. The top portion of the stalk and the foliage falls on the ground rearwardly of the upper cutting means.

The midsection of the cut stalk is carried by the draper to either of two pairs of snapping rolls which pinch the ears off the stalk. The stalk, from which the ears have been removed, falls to the ground, and the ears fall on conveyor means that carries them to the combine for husking and shelling.

Accordingly, the primary object of the present invention is to provide an improved method of harvesting cereal plants by decreasing the amount of foliage which is passed through the operative elements of the machine.

Another object is to increase the efficiency of the harvesting attachment of a machine by providing severing means which severs the nonseed bearing portions of growing cereal plants before the seed bearing portions of the plants are processed by the attachment and the machine.

Suitable structure by means of which the above mentioned and other advantages of the invention are attained will be fully described in the following specification, taken in conjunction with the accompanying drawings showing a preferred embodiment of the invention, in which:

FIG. 1 is a perspective view, partly broken away, of a corn header embodying the invention;

FIG. 2 is a diagrammatic view of the functional parts of the corn header;

FIG. 3 is a perspective view of a modified embodiment of the invention; and

FIG. 4 is a vertical sectional view of the embodiment shown in FIG. 3.

Referring to the drawings, a corn header 10 is provided with a lower cutter bar 11 having its forward edge serrated to form a sharp cutting surface. The lower cutter bar 11 has one end secured to a lever 12 positioned adjacent one of the sidewalls 13 interconnected by a sheet metal plate 13a and forming part of the header. Parts of the plates 13 are broken away for purposes of clarity.

The lever 12 is pivoted intermediate its length, as indicated at 14, on a plate 14a carried by the sidewall or plate 13. The other end of the lever 12 is pivoted at 15 to one end of a link 16 that has its other end rotatably secured to a crank lever 17 carried by crank shaft 18. The crank shaft 18 is driven by a main drive 19 through an intermediate belt drive 21. Rotation of the crank shaft 18 reciprocates the lower cutter bar laterally so that it cuts the standing corn stalks 22 at any desired height as the travel of the combine moves it into engagement with the stalks.

According to the invention, an upper cutter bar 23, similar to the lower cutter bar 11 is operatively connected to the upper end of the crank shaft 18 by a mechanism similar to the mechanism connecting the lower cutter bar to the lower end of the crank shaft. The upper cutter bar is supported by side plates 13 and also reciprocated by rotation of the crank shaft 18. A reel or beater 24 is rotatably mounted rearwardly of the lower cutter bar and forwardly of and above the upper cutter bar 23 by means (not shown). The beater comprises a plurality of blades 25 each supported by slats 26 extending radially from a rotatable shaft 27. The blades have a length equal to the width of the header. The beater is rotated by a belt drive 28 operatively connected to the main drive 19 by shafts 29, 31 and 32 that are interconnected by belts 33 and 34. As the lower cutter bar cuts the standing stalks 22, the beater strikes the upper portions of the cut stalks 35 and causes them to fall rearwardly.

Two laterally spaced conveyors or drapers 36, carry the ear bearing portions of the stalks to either of two pairs of snapping rolls, hereinafter described, and are mounted rearwardly of the lower cutter bar below the beater. If desired, a single draper may extend across the full width of the header.

As the cut stalks 35 fall rearwardly, they are engaged by the upper cutter bar which cuts them into an ear bearing midsection 37 and a nonbearing top section 38. A guard plate 39, positioned over the snapping rolls 41, 42, 43 and 44, and extending rearwardly from the upper cutter bar, prevents the top sections 38 from falling forwardly of the snapping rolls. The top sections, along with most of the foliage, fall through the open spaces behind the rolls directly to the ground, and thus do not cause any portion of the work load capacity of the pinching or snapping rolls to be wasted in processing portions of the stalks that do not have any ears of corn to be pinched therefrom.

The ear bearing midsections 37 of the stalks fall on the top surface of either one of the drapers 36 immediately after the top nonbearing sections 38 have been cut away. The drapers 36 are continuously driven, by means hereinafter described, to carry the ear bearing midsections of the stalks into engagement with the snapping rolls which are arranged in pairs adjacent opposite sides of the header. As shown in FIG. 1, an upper snapping roll 41 and a lower snapping roll 42 are mounted adjacent the right-hand side of the header and an upper roll 43 and a lower roll 44 are mounted adjacent the left-hand side of the header.

The upper snapping roll 41 is mounted on a shift 45 that is rotated by the shaft 31 through belts 46. The lower snapping roll 42 is mounted on a shaft 49 parallel to the shaft 45 and a gear 51 mounted on the shaft 49 is meshed with a gear 52 mounted on the shaft 45. While not specifically shown in FIG. 1, the shafts are supported on plates 13 which extends between the rollers and the gears. The opposite ends of the shafts are supported by a plate 41a. Thus, the interengagement of the gears 51 and 52 causes the lower snapping roll to rotate in the direction opposite the direction of rotation of the upper snapping roll. The shaft 49 drives a belt 53 extending around one end of a shaft 54 to drive the drapers 36.

The snapping rolls 43 and 44 have intermeshed gears 55 and 56 and are rotated in opposite directions at the same speed as the rolls 41 and 42 by a belt 57. The belt 57 is driven by a shaft 58 rotated in a manner hereinafter described.

Two endless chains 59 and 61 secured to opposite edges of a conveyor 62 are driven at the upper end of the conveyor by the shaft 29. The longitudinally extending conveyor 62 has a width approximately equal to the lateral space between the two pairs of snapping rolls and is centrally disposed relative to the width of the header. The upper end of the conveyor 62 is in communication with the threshing cylinder 63 of the combine while the lower end is adjacent the rear end of the drapers. The lower end of the conveyor 62 has a pair of sprockets 64 and 65 meshed with the chains 59 and 61 and rotated thereby. The sprockets 64 and 65 are fixed to the shaft 58 which is supported on the header frame and drives the snapping rolls 43 and 44.

A pair of gathering chains 66 and 67 are mounted on opposite sides of the conveyor 62, and the inner edge of each chain is positioned adjacent one edge of the conveyor in a plane slightly higher than the forward end of the conveyor. The chain 66 is driven by a shaft 69 to carry ears of corn 68 engaged thereby toward the conveyor 62 and discharges them onto the conveyor. The shaft 69 is driven by a belt 71 which is connected to a shaft 71a extending from gearbox 71b. The shaft 71a also drives another belt 72 that drives a shaft 73 for driving the chain 67 in the direction opposite that of the chain 66 to discharge ears of corn engaged thereby onto the conveyor 62. Substantially L-shaped plates 74 extend from the rear edge of plate 13a and have their outer edges connected to side plates 13 while the inner edges extend over the respective side edges of conveyor 62.

Additional plates 75 are disposed below the respective rolls and extend between the respective side plates 13 and the support plates 41a. The forward edges of these plates terminate above the chains 66 and 67 and guide the ears of corn severed by the rolls into the pockets formed by plates 74. The guard plate 39 extending from the cutter 23 is supported by side plates 13 and support plates 41a to guide the severed upper portions 38 of the stalks to the ground, while the opposite ends of the rolls or separating means 41—44 are respectively supported by side plates 13 and 41a.

A baffle 77 mounted above the draper 36 blocks the space in front of the conveyor 62 and diverts the midsections 37 of the cut stalks to either side of the baffle so that the drapers will carry them into engagement with either pair of snapping rolls. As each ear 68 is pinched off the stalk, it is guided into engagement with one of the gathering chains 66 or 67 by a plate 75 mounted underneath the lower snapping rolls. The additional plate prevents the ears from falling from the gathering chain to the ground.

OPERATION

While the operation of the present invention is ascertainable from the above description, it appears that a brief outline of the operation is in order. The standing stalks 22 are cut by the cutting mechanism 11 and substantially simultaneously engaged by the beater 24 so that the cut portion or seed bearing portion 35 of the stalk or cereal plant is forced towards the conveyors or drapers 36. During its descent, the upper non-seed bearing portion of the cereal plant is cut by the second cutting mechanism 23 and the portion 38 is guided by the plate 39 to a point rearwardly of the snapping or pinching rolls 41—44 and passes through one of the openings located on the opposite sides of the conveyor 62 to be deposited on the ground.

The seed bearing portion 37 of the cereal plant is then received on the conveying mechanism 36 and is moved upwardly towards the snapping rolls wherein the stalk is received between the rolls and the seeds or ears of corn are separated therefrom while the stalk is then passed through the openings located on opposite sides of the conveyor 62 and deposited on the ground. The severed ears of corn are guided by the plates 75 into the seed receiving pockets defined by the angle plate 74 and are moved towards the center of the attachment or corn head by the gathering chains 66 and 67. The ears of corn are subsequently received onto the longitudinally extending conveyor and are moved rearwardly towards the threshing cylinder or processing station 63.

Of course, virtually all of the stalks are in substantially the position shown in FIG. 2 after they have been cut by the primary cutting mechanism 11 and will extend substantially longitudinally of the harvesting machine so that the drapers or conveyor 36 will move the upper end of the stalks into engagement with the snapping rolls. While it is conceivable that a small number of stalks may be disposed partially transversely of the harvesting machine, such stalks are to some extent reoriented during the transfer process by the conveyor 36 and will be forced towards the snapping rolls.

Since the normal crop of corn has a single ear of corn on each stalk which is located at substantially the same distance from the ground, the great majority of the stalk may be severed above and below the seed bearing portion of the stalk so as to considerably reduce the length of the stalks which are passed between the snapping rolls thereby greatly increasing the capacity of the harvesting mechanism.

The location and width of the divider for baffle 77 insures that none of the cut stalks are received directly onto the longitudinally extending conveyor 62.

FIGS. 3 AND 4 EMBODIMENT

A slightly modified embodiment of the present invention is disclosed in FIGS. 3 and 4 wherein the structural details of the corn head or harvesting attachment are slightly modified but the basic concept of the present invention remains the same. Since many of the elements in the modified harvesting attachment or corn head 100 are substantially identical to those disclosed in the embodiment of FIGS. 1 and 2, the same reference numerals have been retained for these parts. The substantial difference between the two embodiments is the conveying means or mechanism for conveying the cereal plants between the cutting mechanism 11 and the processing station 63. Also, in the modified embodiment, all of the moving parts are driven by fluid motor means of the conventional type which have been found to be of considerable advantage in commercial structures of this type.

In the modified embodiment disclosed in FIGS. 3 and 4, the conveying means includes a first conveyor or draper 102 which extends rearwardly from the cutting mechanism 11. Adjacent the rear end of the conveyor or draper 102 and disposed transversely in substantially parallel relation thereto is an auger conveyor 104 having auger flights 106 and 108, the inner ends of which are in communication with a longitudinally extending conveyor 110 which is identical to the conveyor 62.

An auger housing or trough is disposed around the lower portion of the right- and left-hand flights 106 and 108 of the transversely extending conveyor 104 and the housing has a vertically extending portion 112 which terminates at a point rearwardly and substantially in horizontal alignment with the lower snapping rolls 42 and 44. As more clearly shown in FIG. 4, the snapping rolls are disposed substantially directly above the transversely extending conveyor 104 and, thus, the ears of corn which are severed from the seed bearing portion 37 of the stalk are received directly into the housing 109 wherein they are moved transversely of the harvesting attachment and are deposited on the longitudinally extending conveyor 110 to be transferred to the processing area 63.

As was indicated above, the snapping rolls 41—44 are supported at opposite ends by the respective side plates 13 and a vertically extending plate 114 which extends from the frame structure 116 disposed below the longitudinally extending conveyor 62. The drive mechanism for driving the respective pairs of snapping rolls, such as 41 and 42, again includes the interengaging gears 51 and 52 (not shown in FIGS. 3 and 4) carried by the respective shafts forming parts of the rolls with one of the shafts being driven by a fluid motor 120 supported on a bracket 122 fixed to the outer edge surface of the side plate 13. While not specifically disclosed in FIG. 3, it is clear that the opposite pair of snapping rolls 43 and 44 are driven in a like manner with the driving mechanism being supported by the other side plate 13.

Since the embodiment disclosed in FIGS. 3 and 4 operates in substantially the same manner as that disclosed in FIGS. 1 and 2, a detailed description of the operation does not appear to be necessary.

Thus, it is seen that the present invention provides a simple and efficient device which can readily be incorporated into a conventional harvesting mechanism and which greatly increases the productivity or output of the harvesting machine due to the elimination of a substantial amount of foliage which must be passed between the snapping rolls 41—44.

What I claim is:

1. A corn header for use with a combine for delivering ears of corn from standing stalks to the combine, said header comprising first and second longitudinally extending rearwardly moving conveyors arranged in end-to-end relation with said first conveyor having a transverse dimension substantially greater than said second conveyor, said second conveyor being centrally disposed relative to said first conveyor to define open areas rearwardly of said first conveyor on opposite sides of said second conveyor; first and second pairs of snapping rolls on opposite sides of said second conveyor and extending transversely substantially the width of said open areas for receiving ear bearing portions of stalks to be harvested; first and second vertically spaced cutters disposed below and above said first conveyor and being coextensive with the transverse dimension of said first conveyor; and transversely moving conveyor means disposed below said snapping rolls and rearwardly of the rear end of said first conveyor for receiving ears severed by said snapping rolls and for delivering the ears to said second conveyor, said first cutter severing corn stalks to be harvested below the ear bearing portion and the second cutter severing the nonbearing top portions of the stalks with the ear bearing portion deposited on said first conveyor and delivered to said snapping rolls for severing the ears from the stalks and delivering the several ears to said second conveyor by said conveyor means with all of the stalk being deposited into the open area on opposite sides of said second conveyor.

2. A corn header as recited in claim 1 including the further improvement of means preventing the nonbearing top portions of said severed stalks from engaging said snapping rolls.

3. A corn header as recited in claim 1, in which said conveyor means comprises a pair of gathering chains, said gathering chains being positioned to engage said ears of corn severed from said stalks by said snapping rolls and oppositely directed to carry said ears of corn to said second conveyor.

4. A corn header as defined in claim 1, including the further improvement of a beater engaging said stalks as they are severed by said first cutter to move said stalks toward engagement with said first conveyor.

5. A corn header as recited in claim 4, and having an interconnected driving means for driving both of said cutters, said conveyor, said first and second conveyors, said snapping rolls and said beater from a single power source.

6. A corn header as recited in claim 1, in which said first conveyor comprises a pair of parallel belts in laterally spaced relationship, and said pairs of snapping rolls are respectively aligned with the ends of said parallel belts, the improvement of first guide means above the space between said parallel belts for directing the cut stalks toward one of said pairs of snapping rolls, and second guide means.

7. A corn header as defined in claim 1, in which said conveyor means comprises a transversely extending auger conveyor having left and right hand flights on opposite sides of said second conveyor.

8. In a harvesting machine having a crop treating section, a corn header for feeding ears of corn to be harvested to said crop treating section and comprising first and second end-to-end rearwardly moving conveyors with said second conveyor having a transverse dimension substantially less than said first conveyor and having opposite edges transversely spaced from adjacent edges of said first conveyor; cutter means above and below said first conveyor for severing stalks of corn above and below the ear bearing portion with the ear bearing portion deposited on said first conveyor; first and second pairs of snapping rolls respectively located on opposite sides of said second conveyor and transversely aligned with the end of said first conveyor for receiving the ear bearing portions of said stalks and removing the ears therefrom; and transversely moving conveyor means for receiving the ears of corn and delivering said ears to said second conveyor.

9. A corn header as defined in claim 8, including guide means comprising first guide members disposed between adjacent ends of the respective pairs of snapping rolls for guiding the ear bearing portion of said stalks to said snapping rolls and second guide members for guiding the upper nonear bearing portions of said stalks away from said conveyor means.

UNITED STATES PATENT OFFICE
CERTIFICATE OF CORRECTION

Patent No. 3,584,443          Dated June 15, 1971

Inventor(s) Shelly A. Bulin

It is certified that error appears in the above-identified patent and that said Letters Patent are hereby corrected as shown below:

Column 2, line 69, "shift" should read -- shaft --. Column 5, line 49, "several" should read -- severed --.

Signed and sealed this 23rd day of November 1971.

(SEAL)
Attest:

EDWARD M. FLETCHER, JR.          ROBERT GOTTSCHALK
Attesting Officer                Acting Commissioner of Patents

UNITED STATES PATENT OFFICE
CERTIFICATE OF CORRECTION

Patent No. 3,584,443      Dated June 15, 1971

Inventor(s) Shelly A. Bulin

It is certified that error appears in the above-identified patent and that said Letters Patent are hereby corrected as shown below:

Column 2, line 69, "shift" should read -- shaft --. Column 5, line 49, "several" should read -- severed --. Column 6, line 15, "said", second occurrence, should be cancelled; line 16, cancel "conveyor,".

Signed and sealed this 1st day of August 1972.

(SEAL)
Attest:

EDWARD M. FLETCHER, JR.       ROBERT GOTTSCHALK
Attesting Officer      Commissioner of Patents